3,041,180
SOLID ESSENTIAL OIL FLAVORING COMPOSITION AND PROCESS FOR PREPARING THE SAME
Horton E. Swisher, Upland, Calif., assignor to Sunkist Growers, Inc., Los Angeles, Calif., a corporation of California
Filed Oct. 11, 1957, Ser. No. 689,719
15 Claims. (Cl. 99—140)

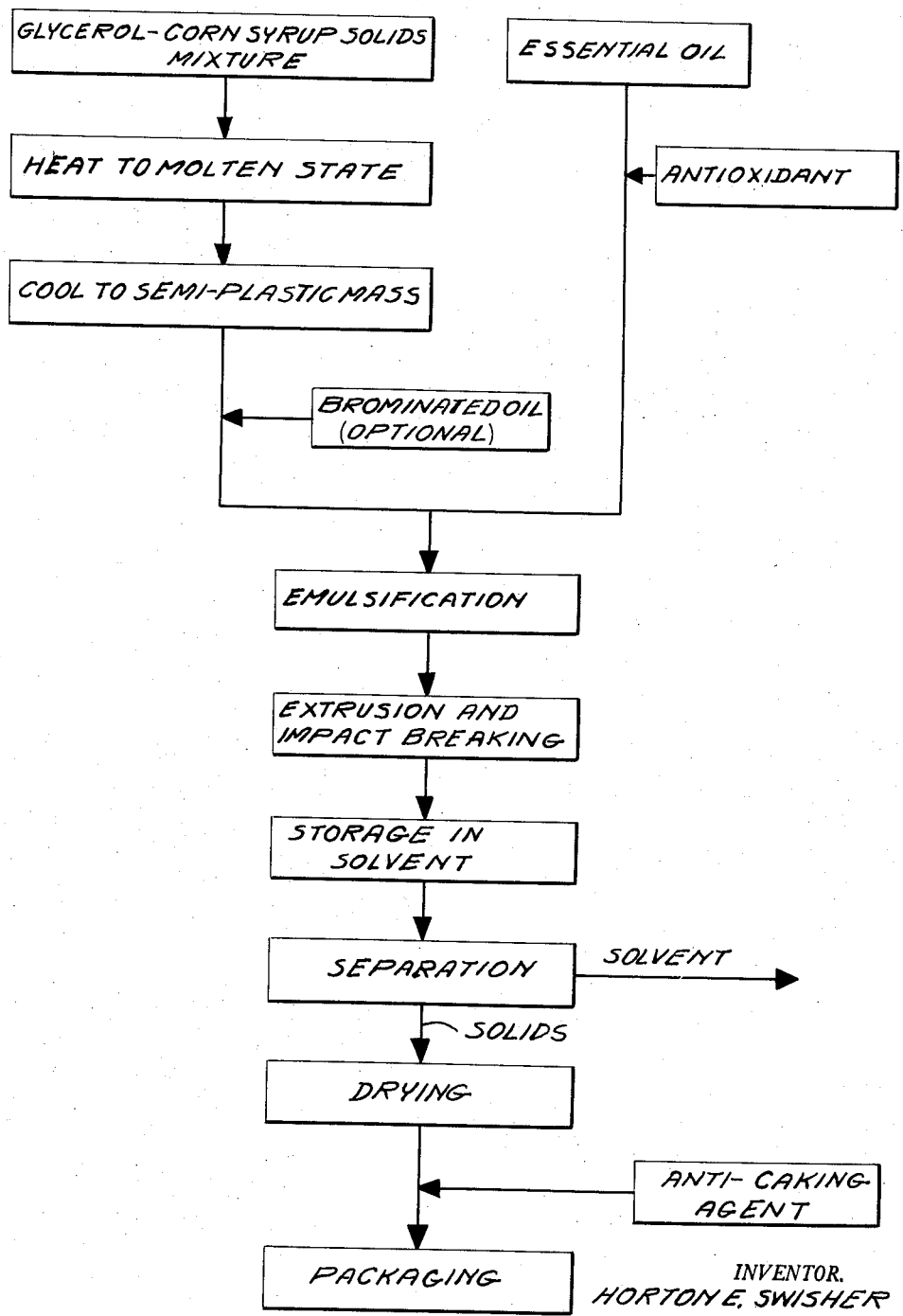

This invention relates to the preservation of essential oils and has particular reference to a solid essential oil flavoring composition and to a process for preparing the same.

As is pointed out in my co-pending application Serial No. 519,719, filed July 5, 1955, on "Solid Flavoring Composition and Method of Preparing the Same," now Patent No. 2,809,895, the problems involved in the storage and utilization of essential oils in dry form are greatly complicated by the extreme sensitivity of such oils to the effects of heat, light, air and moisture. The aforesaid co-pending application discloses a solid, particulate emulsion comprising corn syrup solids and an essential oil, and a process for its preparation, wherein the utilization of a corn syrup solids-corn syrup mixture as the continuous phase of the emulsion permits the formation of an amorphous end product having a substantially increased storage life with extremely favorable flavor retentivity characteristics and having a moisture content sufficiently low to permit use of the dried product in many pre-packaged dry mixes.

I have now found that notwithstanding the marked advantages resulting from the practice of the process of the aforesaid co-pending application, an essential oil-containing product possessing even further advantages over those already known to the art can be produced by the process of the present invention, constituting an improvement over the process of said co-pending application. A primary object of the present invention is, therefore, to provide an essential oil-containing solid product having greatly increased resistance to oxidative deterioration during storage.

Another object of the present invention is to provide a solid product containing an essential oil and having a substantially lessened moisture content, greater size uniformity and increased flavor desirability.

More specifically, an object of the present invention is to provide a novel process for the emulsification of an essential oil in a molten mixture of corn syrup solids and glycerol and the formation of an oxidation-protected solid amorphous particulate essential oil emulsion.

Still another object of the present invention is to provide an improved method for the formation of an essentially anhydrous particulate solid emulsion from a liquid emulsion of corn syrup solids, glycerol and an essential oil.

Other objects and advantages of the present invention it is believed will be readily apparent from the following detailed description of preferred embodiments thereof when read in connection with the accompanying drawings.

In the drawings:

The single FIGURE is a flow sheet illustrating the process of the present invention.

Briefly, this invention comprehends within its scope the discovery that an improved product is obtained by emulsifying an essentially water insoluble essential oil with a molten mixture of glycerol and corn syrup solids as the continuous phase, extruding the emulsified mass in the form of filaments into a cold fluid, preferably an organic solvent for the essential oils which is a nonsolvent for the corn syrup solids, followed by impact breaking of the solidified filaments into small particles of usable form and then holding the particles in the solvent, preferably for an extended period, to remove essential oil from the surfaces of the particles, together with a substantial portion of the residual moisture contained on and in the particles.

Referring now to the drawing, in carrying out the process of the present invention, a glycerol corn syrup solids mixture having a glycerol content of from about 2% to about 15%, and preferably from about 4% to about 9%, of the total weight of the mixture is heated to a temperature between about 110° and about 130° C. with agitation in order to form a syrup of uniform homogeneity and low moisture content. The corn syrup solids preferably utilized are commercially available as a granular product of 42 D.E. (dextrose equivalent) and containing not less than 3% moisture with an average moisture content of 3½%, although corn syrup or corn syrup-corn syrup solids mixtures, or solutions having higher initial moisture contents may be used and reduced to the desired moisture content by heating as taught in said co-pending application.

The glycerol, preferably anhydrous, provides a liquid medium in which the corn syrup solids are soluble and having adequate heat transfer properties to permit melting of the corn syrup solids. The low vapor pressure of the glycerol at room temperature is also an important characteristic rendering it valuable for use in the present invention. The molten glycerol-corn syrup solids mixture is then cooled to a temperature within the range of about 80° to about 115° C., and preferably between about 100° and about 110° C. in order to permit introduction of the essential oil into the molten mass at the lowest temperature consistent with proper emulsification and to minimize heat degradation of the essential oil. It should be noted that because of the amorphous character of the molten mass, it may be cooled to a temperature within the range specified without so materially increasing its viscosity as to prevent incorporation of a sufficient amount of essential oil to produce a satisfactory product. In some cases it may be desired to cool the mass under vacuum to remove additional water and any air bubbles that might be incorporated during the agitation.

If the process is utilized in the production of a dry end product suitable for use as a bottler's base it may be desired to incorporate in the mixture at this stage, a brominated oil in order to weight the essential oil and to thus increase the cloud stability thereof. This step is shown in the flow sheet as an optional one.

A minor amount of an emulsifying or dispersing agent is added to the cooled mixture at this stage, either prior to or along with the addition of the essential oil. I have found that the following representative emulsifiers are suitable for use: mono-glyceride sodium sulfo-acetate, diacetyl tartaric acid ester of a monodiglyceride, polymeric alkylaryl polyether alcohol, polyethylene glycol fatty acid esters, sucrose esters of fatty acids (sucrose dipalmitate), sodium lauryl sulfate, vegetable oils, glyceryl monostearate, acetylated monoglycerides, citrus stearoptene, lecithin, gum arabic, locust bean gum, guar gum, tragacanth gum, pectin, pectin albedo, agar and algin. Not more than about 2% by weight of the emulsifier is generally required.

The specific essential oil which it is desired to produce in solid particulate form should preferably be as dry as possible before incorporating it into the cooled, molten mass. Thus, citrus oils should be centrifuged and dried over anhydrous sodium sulfate. The oils, particularly those high in terpene (d-limonene) content such as cold pressed lemon or orange oil (the principal constituent of which d-limonene), should also be protected against undue oxidation as a result of subjecting the oil to heat during emulsification. This is accomplished by the addition of a minor amount of an oil soluble, heat stable antioxidant such as 4-methyl-2,6-ditertiary butyl phenol or butylated hydroxyanisole. Generally from 0.05–0.5% by weight, based on the essential oil, is a sufficient amount of antioxidant.

The antioxidant-treated essential oil is then added to the glycerol-corn syrup solids syrup and the resulting mixture emulsified by agitation in a jacketed kettle. This agitation may be accomplished under an inert gas atmosphere such as nitrogen or carbon dioxide, if desired. The emulsion is preferably immediately extruded into filaments of an average diameter of 1/64-inch. The extrusion may, if desired, be accomplished under pressure, either mechanical or under a head of gas, into a cool, dry atmosphere to cool and solidify the resulting filaments. The filaments can subsequently be subdivided by mechanical devices such as rollers or impellers, and then treated with an anti-caking agent such as calcium phosphate in order to provide the stabilized solid particulate essential oil-containing end product. Other mechanical methods for solidification and particulization, such as those taught in said co-pending application, may be utilized.

However, after emulsification, it is preferred to extrude the still hot (80°–115° C.) emulsion through air into a cold organic solvent for the essential oil which is a nonsolvent for the corn syrup solids. A high proof isopropanol is preferred. Suitable volatile solvents include ethyl alcohol (preferably 95%); deodorized hydrocarbon solvents such as kerosene, petroleum ether and the like; methyl alcohol; acetone; methyl ethyl ketone; limonene; benzene and toluene. Highly volatile liquid Freon may also be used if it is kept under pressure while solvent washing the solid flavor particles and during the subsequent draining-off of the excess solvent. Upon releasing the pressure, the small residual liquid Freon on the solid particles will completely evaporate at room temperature without the necessity of applying a vacuum.

The function of the solvent is two-fold: (1) to act as a coolant, thus solidifying the flavor filaments rapidly and to remove any essential oil released onto the surfaces of the emulsion particles during the impact breaking step. While the volatile solvents are preferred since they can be readily evaporated from the surface of the particles under vacuum conditions and the essential oil recovered therefrom, essentially non-volatile solvents may be used if they are removed from the solidified particles with another solvent which can be surface evaporated. For example, extrusion may take place into mineral oil, the particles drained and the residual mineral oil removed with petroleum ether or the like. Other solvents of the non-volatile type include butyl stearate, vegetable oils, hydrogenated vegetable oils and brominated vegetable oils.

The temperature of the solvent may vary down from room temperature to as low as 0° F. Temperatures somewhat below room temperature, i.e., in the neighborhood of about 50° F. are preferred in order to assure quick solidification and to minimize the fire hazard.

Preferably the extrusion apparatus, which is not shown nor described in detail since it is of conventional construction familiar to those skilled in the art, is mounted vertically so that the extruded filaments will be free-falling, thus avoiding contact between individual filaments while still in a molten condition and likely to adhere together. In order to maintain the pressure head required to force the semi-plastic emulsion through the small openings in the extrusion plate, a pump, a screw or gas pressure may be utilized. In the latter event, it is preferably to use an inert gas such as nitrogen, although as a practical matter, air is completely satisfactory.

The desired diameter of the filaments may be obtained by controlling the temperature at the time of extrusion, the size of the opening in the extrusion plate, the pressure head used and the distance between the extrusion head and the cool body of solvent. With respect to the last-named factor, the greater the distance, the smaller the diameter of the filaments, since gravitational forces will tend to elongate the filaments while they are in the molten condition. As soon as the filaments contact the cool solvent their temperature is lowered and they become brittle, nonplastic amorphous solids.

The solid filaments are readily reduced to a usable form by impact breaking in the same type of solvent used for the solidification step. Preferably this is accomplished by removing the filaments from the solvent-containing tank or other vessel into which they were extruded and placing them in additional solvent such as isopropanol to form a slurry. The slurry is then subjected to the action of an agitator impeller operating at a speed of 1500–2000 r.p.m., the impact of the impeller blades breaking the cylindrical filaments into continuously shorter lengths. The practical limit to which the length of the particles can be reduced in this manner is reached when the length of the cylinder is equal to its diameter. At this point the physical strength of the small cylinders is approximately equal along either of their major axes so that there will be little or no tendency to cause further reduction in size by this method of breaking. Thus, uniform particle size is accomplished, a result not possible to attain utilizing more conventional grinding methods. Moreover, far less new surface is exposed upon breaking a cylinder than is the case where irregular shaped particles are broken by grinding.

A further advantage of impact breaking of the flavor cylinders in the isopropanol slurry is that any essential oil released, when the cleavage line coincides with the minute essential oil droplets in the solid emulsion, is removed by the solvent. This avoids the presence of any surface oil which on storage would become "terpy" as well as providing for the recovery and later re-use of the surface oil if desired.

If desired, the particles may be removed from the solvent, dried under vacuum to remove surface solvent and then transferred to a sealed container over calcium oxide and stored until the desired moisture level is reached. In-package desiccants may also be used.

Preferably, however, as shown in the drawing, the impact breaking step is followed by a period of storage of the essential oil-containing particles under isopropanol or any of the other volatile solvents listed above, particularly those that are water miscible as well as solvents for the oils and nonsolvents for the corn syrup solids, such as the alcohols, acetone and the like. It has been discovered that extraction of substantial proportions of the relatively low amount of water present in the solid emulsion without removal of other than surface oil, is possible by such storage. Using this method, it was found possible to produce a flavor emulsion with an original moisture content of roughly 3 to 8% and reduce it to a level of ½ to 2%, a virtually anhydrous product.

The storage period may vary from two or three hours to several days. The length of time depends upon the initial moisture content of the particles, the solvent temperature (lower temperature requiring longer storage periods) and to a degree, the relative volumes of the solids and the solvent. For very low final moisture contents, periods of several weeks may be used.

Following the solvent storage step the mixture is screened or centrifuged to separate the solid emulsion particles from the solvent. At this point it is preferred to screen out any particles longer than 20 mesh. The particles are then dried on a shelf drier and then tumbled with an anti-caking agent such as about 2% of tri-calcium phosphate. This mixture is packaged in a dehumidified room to provide the final product.

The inclusion of the glycerol appears to be an important adjunct to the success of the above-described method of solidification and moisture removal in that the glycerol appears to have a decided plasticizing action upon the emulsion. In the absence of the glycerol, the temperature change required to solidify the molten emulsion from the extruder causes many microscopic fissures or cracks in the filaments with subsequent release of essential oil. Such cracks do not form in the glycerol-corn syrup solids mixture, even when extrusion takes place into isopropanol at a temperature as low as 0° F. The same cracking or fissuring occurs during storage under isopropanol in the absence of the glycerol, but is avoided when glycerol is utilized as a component of the composition. The glycerol, in addition to this and the other functions described hereinbefore, acts as a secondary emulsifier to assure adequate emulsification, and has a stabilizing effect upon the essential oils. Any non-toxic glycol could be substituted in whole or part for the glycerol but glycerol is preferred because of its lack of flavor in the concentrations utilized. Propylene glycol for example, could be used in place of or in addition to all or part of the glycerol, but its slight bitter flavor would militate against its use in many flavor preparations.

Another advantage resulting from the solvent storage step resides in the fact that this treatment raises the softening point of the product, possibly due to removal of moisture and removal of a portion of the glycerol. This is an important consideration if the finished product is to be stored for extended periods at elevated temperature inasmuch as products having high softening points possess the greatest stability under such conditions.

The following specific examples illustrate the process of the present invention, but it is to be understood that the invention is not to be limited thereto:

Example 1.—Orange Oil 4716 g. corn syrup solids 3.5% moisture content) was added slowly with impeller stirring to 480 U.S.P. glycerol in a steam jacketed stainless steel kettle heated to a temperature of 126° C. After cooling to 109° C., 84 g. of a mono-diglyceride of sodium sulfoacetate was added. 720 g. cold pressed orange oil containing 0.1% by weight of butylated hydroxytoluene was then added slowly to the hot mixture at a temperature of 108° C. On completion of oil emulsification, the semi-plastic emulsified oil composition was transferred to a steam-jacketed extruder and extruded under air pressure of 32 lbs. per square inch through small holes (about 1/64-inch diameter) into 99.6% isopropanol at 20° C. to solidify the filaments or cylinders.

Impact breaking of the long solid flavor cylinders was accomplished by the use of a Cowles Dissolver impeller. The particulate material was then allowed to stand under isopropanol for 48 hours, drained and dried under vacuum and 0.5% of tri-calcium phosphate added as an anti-caking agent to produce the finished solid orange oil emulsion flavoring having a moisture content of 2.53%.

Example 2.—Peppermint Oil 253 g. of 95% glycerol was heated in a steam jacketed round bottom kettle while 2555 g. of fine granular corn syrup solids (3.5% moisture) was added slowly with constant stirring. With the steam jacket pressure at 30 lbs., per square inch the temperature of the glycerol-corn syrup solids "melt" was raised to 125° C. After cooling the melt to 120° C., 42 g. of monostearin sodium sulfo-acetate was added while stirring with a motor driven impeller. Finally, 150 g. of natural peppermint oil was added to the melt at 115° C. with continued stirring until all of the essential oil was emulsified.

The emulsified oil composition was then poured into a steam jacketed leg arranged vertically with a bottom extrusion plate containing holes of approximately 1/64-inch diameter. By applying 32 lbs. per square inch air pressure above the surface of the plastic material, flavor cylinders were extruded into a vessel containing isopropanol at room temperature. The hair-like flavor cylinders solidified immediately and were reduced to the desired length of approximately three times diameter by impact breaking of the solid flavor isopropanol slurry using a motor driven impeller blade. The product was allowed to stand under isopropanol for 144 hours.

The excess alcohol was drained off and the solid peppermint flavoring material was dried under vacuum.

An excellently flavored peppermint oil of 1.63% moisture was obtained.

Example 3.—Grapefruit Oil

To 480 g. of 95% U.S.P. glycerol in a steam jacketed stainless steel round bottom kettle was added slowly 471 g. of fine granular corn syrup solids (3.5% moisture) with constant stirring. Under 30 lbs. per square inch steam pressure the glycerol-corn syrup solids mixture was heated to 120° C. After cooling to 116° C., 84 g. monostearin sodium sulfo-acetate was added while stirring with a motor driven impeller blade. After further cooling to 112° C., 720 g. C.P. grapefruit oil containing 0.1% by weight of butylated hydroxytoluene was emulsified into the melt by means of continued stirring.

After transferring the semi-plastic composition to a steam jacketed leg, it was extruded under air pressure of 32 lbs. through the extrusion plate into cold isopropanol. The brittle hair-like flavor cylinders were reduced to the desired size by means of impact breaking of the isopropanol-flavor cylinder slurry with a motor driven impeller blade. The product was allowed to stand under isopropanol for 48 hours.

The excess alcohol was drained off and the solid grapefruit flavoring material was dried under vacuum.

Example 4.—Ethyl Anthranilate

To 100 g. of 95% U.S.P. glycerol in a steam jacketed kettle, 865 g. of fine granular corn syrup solids (3.5% moisture) was added with constant stirring. With the steam jacket pressure at 30 lbs. per square inch the temperature of the "melt" was brought up to 120° C. At this temperature 10 g. of monostearin sodium sulfo-acetate was added, followed by 25 g. ethyl anthranilate at 115° C.

Upon the completion of emulsification, the semi-plastic composition was transferred to a steam jacketed leg and extruded by means of 32 lbs. per square inch air pressure thru a plate with 1/64 inch holes into cold (20° C.) isopropanol.

The solid flavor cylinders were reduced to the desired length by impact-breaking of the isopropanol-solids slurry and allowed to stand under isopropanol for 36 hours.

After draining off the isopropanol, the solid ethyl anthranilate flavoring cylinders were dried under vacuum. The moisture content of the product was 3.10%.

Ethyl anthranilate has an orange blossom odor and flavor, much like that of artificial oil of neroli and imparts a "freshness" to orange or lemon beverages.

Example 5.—Methyl Salicylate (Oil of Wintergreen)

253 g. of 95% U.S.P. glycerol was heated in a steam jacketed round bottom kettle while 2555 g. of fine granular corn syrup solids (3.5% moisture) was added slowly with constant stirring. With 30 lbs. per square inch of steam on the jacket, the temperature of the melt was raised to 125° C. After cooling the melt to 115° C., 42 g. of monostearin sodium sulfo-acetate was added followed by 150 g. of U.S.P. methyl salicylate. Stirring was continued until the oil of wintergreen was emulsified.

After transferring the semi-plastic flavoring composition to a jacketed leg, it was extruded through a plate with 1/64-inch holes into cold (20° C.) isopropanol.

Breaking up of the solid flavoring cylinders was accomplished by means of a motor driven impeller blade operating under the slurry of solid flavor isopropanol. The cylinders were held under isopropanol for 96 hours.

After removing the excess isopropanol under vacuum, the final product contained 2.26% moisture.

*Example 6.—Lemon Oil*

To 480 g. U.S.P. glycerol in a steam-jacketed kettle was added slowly with stirring and heating 5046 g. corn syrup solids (3.5% moisture) to a temperature of 128° C. The semi-plastic mixture was cooled to 110° C. and 69 g. of a mono-diglyceride of sodium sulfo-acetate added. 390 g. of cold pressed lemon oil, containing 0.1% by weight of butylated hydroxytoluene, was added slowly with mixing at a temperature of 108° C. The resultant semi-plastic emulsified oil composition was transferred to a steam-jacketed leg and extruded through holes of approximately $1/64$ inch in a stainless steel plate under air pressure of 34 lbs. per square inch. The lemon flavored extruded cylinders were allowed to fall into a container holding 99.6% isopropanol to solidify and remove any surface oil.

Reduction in length of the long extruded cylinders was accomplished by impact breaking of the material under a minimum quantity of isopropanol. A high speed impeller blade reduced the long cylinders to an alcohol-solids slurry of short rods.

This flavor product was allowed to stand under isopropanol for 72 hours, drained and dried under vacuum to produce the desired solid lemon oil emulsion flavoring containing 2.32% moisture. To this material was added $35/100$ of 1% tri-calcium phosphate as an anticaking agent.

The essential oil compositions of the present invention have an ordinary storage life at room temperature or above in excess of one year. The compositions are particularly well suited for the preparation of dehydrated beverage products containing citric acid, sugar and fruit solids or other additional flavoring constituents. Such beverage products are easily reconstituted with water to provide the beverage itself. The solid emulsions of the present invention are also well suited for use as a flavoring condiment for pastries and other food products.

Having fully described my invention, it is to be understood that I do not wish to be limited to the details herein set forth, but my invention is of the full scope of the appended claims.

I claim:

1. A process for the preparation of an essential oil solid emulsion comprising the steps of admixing with corn syrup solids a material selected from the group consisting of glycerol, a non-toxic glycol and mixtures thereof, heating the admixture to a temperature sufficiently high to form a syrup thereof, adding an emulsifying agent and an essential oil, emulsifying the resulting composition by agitation thereof, forming a solid emulsion therefrom, and subdividing the solid emulsion into particulate form.

2. A solid particulate emulsion of an essential oil in a mixture of (1) corn syrup solids and (2) between about 2% and about 15% by weight, based on the total weight of said mixture, of a material selected from the group consisting of glycerol, a non-toxic glycol and mixtures thereof, said emulsion containing a minor amount of an emulsifier, and the particle surfaces of said emulsion being free from essential oil.

3. A process for the preparation of an essential oil solid emulsion comprising the steps of admixing with corn syrup solids from about 2% to about 15%, based upon the total weight of the emulsion of a nontoxic glycol, heating the admixture to a temperature sufficiently high to form a syrup thereof, adding an emulsifying agent and an essential oil, emulsifying the resulting composition by agitation thereof, forming a solid emulsion therefrom by extruding said resulting composition in a filament form into a cold fluid, subdividing the solidified filaments to form a particulate solid emulsion.

4. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and an essential oil, emulsifying the resulting composition by agitation thereof, extruding said resulting composition in filament form into a cold fluid to solidify said composition, and subdividing the solidified filaments to form a solid particulate emulsion.

5. A process for the preparation of an essential oil solid emulsion comprising the steps of heating a glycerol-corn syrup solids mixture to a temperature of between about 110° and about 130° C. to form a homogeneous syrup therefrom, said corn syrup solids having a dextrose equivalent of 42 and a moisture content of 3–3.5%, cooling said syrup to a temperature of between about 80° and about 115° C., adding an emulsifying agent and an essential oil, emulsifying the resulting composition by agitation thereof, extruding said resulting composition into a solvent for said essential oil which is a nonsolvent for said corn syrup solids to form a solid emulsion therefrom, and subdividing the solidified emulsion into particulate form.

6. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and an essential oil, emulsifying the resulting composition by agitation thereof, extruding said resulting composition into a cold fluid to form a solid emulsion therefrom, subdividing the solid emulsion into particles, and holding the solid particulate emulsion immersed in a water-miscible solvent for said essential oil which is a nonsolvent for said corn syrup solids for a sufficient time to remove moisture from said solid emulsion.

7. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and an essential oil, emulsifying the resulting composition by agitation thereof, extruding said resulting composition into a cold solvent for said essential oil which is a nonsolvent for said corn syrup solids to form a solid emulsion therefrom, subdividing the solid emulsion into particles, and holding the solid particulate emulsion immersed in a water-miscible solvent for said essential oil which is a nonsolvent for said corn syrup solids for a sufficient time to remove moisture from said solid emulsion.

8. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and an essential oil, emulsifying the resulting composition by agitation thereof, extruding said resulting composition into isopropanol to form a solid emulsion therefrom, subdividing said solid emulsion into particles, and holding said solid emulsion particles immersed in isopropanol for a sufficient time to remove moisture from said solid emulsion.

9. A process for the preparation of an essential oil solid emulsion comprising the steps of heating a glycerol-corn syrup solids mixture to a temperature of between about 110° and about 130° C. to form a homogeneous syrup therefrom, said corn syrup solids having a dextrose equivalent of 42 and a moisture content of 3–3.5%, said glycerol being present in an amount between about 4% and about 9% by weight, based on the total weight of the emulsion, cooling said syrup to a temperature of between about 80° and about 115° C., adding an emulsifying agent and a citrus oil, emulsifying the resulting composition by agitation thereof, forming a solid emulsion therefrom by extruding said resulting composition in filament form into a cold fluid, and subdividing the solidified filaments to form a particulate solid emulsion.

10. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and an essential oil, emulsifying the resulting composition by agitation thereof, extruding said resulting composition into a cold fluid to form a plurality of filaments of a solid emulsion therefrom and impact breaking said solid filaments to form a solid particulate emulsion.

11. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and a citrus oil containing an antioxidant, emulsifying the resulting composition by agitation thereof, forming a particulate solid emulsion therefrom, by extruding said resulting composition in filament form into a cold fluid, and subdividing the solidified filaments to form a particulate solid emulsion.

12. A process for the preparation of an essential oil solid emulsion comprising the steps of heating a glycerol-corn syrup solids mixture to a temperature of between about 110° and about 130° C. to form a homogeneous syrup therefrom, cooling said syrup to a temperature of between about 80° and about 115° C., adding an emulsifying agent and a citrus oil containing an antioxidant, emulsifying the resulting composition by agitation thereof, extruding said resulting composition in the form of filaments into a cold solvent for said citrus oil which is a nonsolvent for said corn syrup solids to solidify said filaments, impact breaking said solid filaments to form a particulate solid emulsion, and holding said solid emulsion particles in a water-miscible solvent for said citrus oil which is a nonsolvent for said corn syrup solids for a sufficient time to remove moisture from said solid emulsion.

13. A process for the preparation of an essential oil solid emulsion comprising the steps of heating a glycerol-corn syrup solids mixture to a temperature of between about 110° and about 130° C. to form a homogeneous syrup therefrom, said glycerol being present in an amount between about 4% and about 15% by weight, based on the total weight of the emulsion, cooling said syrup to a temperature of between about 100° and about 110° C., adding an emulsifying agent and a citrus oil containing an antioxidant, emulsifying the resulting composition by agitation thereof, extruding said resulting composition in the form of filaments into cold isopropanol to solidify said filaments, impact breaking said solid filaments in an isopropanol slurry to form a particulate solid emulsion, and holding said solid emulsion particles in isopropanol for a time sufficient to remove moisture from said solid emulsion particles.

14. A glycol-corn syrup solids essential oil emulsion in solid particle form, the particle surfaces of which are free from essential oil, and containing a minor amount of an emulsifier.

15. A solid particulate emulsion of citrus oil in a glycerol-corn syrup solids mixture, the particle surfaces of said emulsion being free from citrus oil, said emulsion containing minor amounts of an oil soluble, stable antioxidant and an emulsifier, the moisture content of said emulsion being from ½ to about 2%.

References Cited in the file of this patent

UNITED STATES PATENTS

| 2,566,410 | Griffin | Sept. 4, 1951 |
| 2,809,895 | Swisher | Oct. 15, 1957 |
| 2,856,291 | Schultz | Oct. 14, 1958 |

OTHER REFERENCES

"Sorbitol," copyright 1947 by Atlas Powder Company, Wilmington 99, Del., pages 9 and 10.